(12) United States Patent
Abelli et al.

(10) Patent No.: US 7,754,339 B2
(45) Date of Patent: Jul. 13, 2010

(54) REFLECTIVE PAINT AND A METHOD FOR ITS USE

(75) Inventors: Michele Abelli, Morelli (IT); Francesco De Bastiani, Modena (IT); Marcello Romagnoli, Sassuolo (IT)

(73) Assignee: Corob S.p.A., Modena (IT)

( * ) Notice: Subject to any disclaimer, the term of this patent is extended or adjusted under 35 U.S.C. 154(b) by 776 days.

(21) Appl. No.: 10/398,118

(22) PCT Filed: Oct. 3, 2001

(86) PCT No.: PCT/IB01/01831

§ 371 (c)(1),
(2), (4) Date: Apr. 3, 2003

(87) PCT Pub. No.: WO02/28975

PCT Pub. Date: Apr. 11, 2002

(65) Prior Publication Data

US 2004/0013900 A1    Jan. 22, 2004

(30) Foreign Application Priority Data

Oct. 3, 2000  (IT) .......................... BO2000A0571
Mar. 16, 2001  (IT) .......................... BO2001A0142

(51) Int. Cl.
B32B 27/00 (2006.01)
B32B 27/08 (2006.01)
B32B 27/30 (2006.01)
B05B 5/00 (2006.01)
C08K 3/30 (2006.01)
C08K 3/00 (2006.01)
C08K 3/18 (2006.01)

(52) U.S. Cl. ...................... 428/461; 428/520; 428/522; 427/160; 524/423; 524/424; 524/430

(58) Field of Classification Search .................. 524/423, 524/424, 430; 428/461, 520, 522; 427/160
See application file for complete search history.

(56) References Cited

U.S. PATENT DOCUMENTS

| 3,901,688 A | * | 8/1975 | Casey et al. ................. 428/687 |
| 3,951,721 A |   | 4/1976 | Ishibai et al. |
| 3,956,201 A | * | 5/1976 | Seiner ......................... 521/145 |
| 4,035,085 A | * | 7/1977 | Seiner ......................... 356/408 |
| 4,265,797 A |   | 5/1981 | Suk |
| 4,267,453 A |   | 5/1981 | Kieboom et al. |
| 4,658,141 A |   | 4/1987 | Wilt et al. |
| 5,420,190 A | * | 5/1995 | Gane ........................... 524/446 |
| 5,834,549 A | * | 11/1998 | Suezaki et al. ............... 524/409 |

FOREIGN PATENT DOCUMENTS

| EP | 0 146 255 A |   | 6/1985 |
| EP | 0 756 297 | * | 1/1997 |
| GB | 2 016 681 A |   | 9/1979 |
| JP | 52-46974 B |   | 11/1977 |
| JP | 58-88683 A |   | 5/1983 |
| JP | 3-44521 A |   | 2/1991 |
| JP | 54-137384 |   | 5/1991 |
| JP | 7-212537 A |   | 8/1995 |
| JP | 8-157383 | * | 6/1996 |
| JP | 09-202715 | * | 8/1997 |
| JP | 2000-321126 A |   | 11/2000 |
| JP | 2000-321127 A |   | 11/2000 |
| JP | 2000-321128 A |   | 11/2000 |
| JP | 2000-321129 A |   | 11/2000 |
| NL | 8 204 539 A |   | 6/1983 |

OTHER PUBLICATIONS

RU 2142975, "Aqueous Dispersive Paint" (Dec. 1999) Derwent Abstract.*
Perry's Chemical Engineer's Handbook, 7th ed., McGraw-Hill, New York US (1997).
Encyclopedia of Polymer Science and Engineering, vol. 3, John Wiley & Sons, New York (US) (1985).
The Office Action from the European Patent Office dated Jun. 23, 2005.
The Office Action from the European Patent Office dated Oct. 26, 2005.

* cited by examiner

Primary Examiner—Sheeba Ahmed
(74) Attorney, Agent, or Firm—Sughrue Mion, PLLC

(57) ABSTRACT

A highly reflective coating painting product, particularly suitable as a coating for integrating spheres, comprises a diffusely reflective product such as, for example, barium sulphate, and an acrylic binder or glue, which are dispersed in a liquid vehicle, preferably constituted by a mixture of water and alcohol. The acrylic binder or glue is a product based on acrylic polymer or copolymer the quantity of which in the coating product is between about 1% and 15%, and preferably between 3% and 4%, by weight, relative to the reflective product. The coating product is applied to a surface in successive layers until a thickness of at least 0.5 mm is reached. The surface coated with the product is then subjected to heating, preferably at about 100° C., for about 1 hour.

36 Claims, No Drawings

REFLECTIVE PAINT AND A METHOD FOR ITS USE

This is a National Stage Entry of Application No. PCT/IB01/01831 filed Oct. 3, 2001; the disclosure of which is incorporated herein by reference.

BACKGROUND OF THE INVENTION

The present invention relates in general to a highly reflective painting product. The invention has been developed in particular, but not exclusively, in connection with a painting product suitable as a coating for integrating spheres of spectrophotometers and the like, the spheres being intended for collecting and measuring luminous radiation reflected diffusely in all directions by a generic sample. Naturally, the use of the above-mentioned painting product may extend to other uses, for example, but not exclusively, for coating the surfaces of standard samples of known reflectance which are used, for example, for calibrating spectrophotometers, or as a coating for spheres which constitute sources of amplified and homogeneous light. Other possible uses of the product which, again, are given by way of non-limiting example, relate to the lighting design field and comprise the coating of covers, panels and diffusive reflective surfaces for lighting in general.

In general, integrating spheres collect and spatially integrate a radiant flux. The flux may be measured directly or after it has interacted with a sample of material. The sphere, as part of a radiometer or photometer, can directly collect and amplify the flux originating from lamps or lasers, or the flux density produced by a hemispherical illumination. Perhaps the most important application of integrating spheres is for the measurement of the total reflectance or of the transmittance of diffusive or dispersive materials. An alternative application uses the holes in an integrating sphere, which is illuminated internally, as a source of uniform radiance. These sources can be used for calibrating electronic image devices and systems or simply as uniform back-lighters.

It has been known for some time to use, in spectrophotometers, integrating spheres each having a spherical internal cavity coated by a highly diffusely reflective layer or coating film by virtue of which the luminous flux of a source can be amplified, rendering it homogeneous and isotropic. An integrating sphere of this type generally has an opening in front of which a sample can be placed, the sample reflecting into the sphere a light beam which in turn is reflected and diffused by the wall of the internal cavity of the sphere and is measured by sensors of known type.

As mentioned, for example, in the documents U.S. Pat. Nos. 3,764,364, 4,035,085 and EP-0511806, it has been known for some time to coat or paint the internal cavities of integrating spheres with products based on barium sulphate, magnesium oxide and/or magnesium carbonate, whereas, more recently, long-chain fluorinated aliphatic addition-polymer films have been proposed. The known products based on barium sulphate present a series of problems, amongst which sensitivity to moisture and poor mechanical strength, which cause the coating layers of the integrating spheres treated with these products to deteriorate easily, are known. Moreover, the known products based on barium sulphate have poor resistance to ultraviolet radiation and tend to age rapidly, so that their reflectance characteristics are reduced.

The above-mentioned addition-polymer films in turn have been found difficult to apply to the wall of the internal cavity of an integrating sphere. To solve this latter problem, the document EP-0511806 proposes the solution of forming the entire body of an integrating sphere of this polymer material so as to eliminate all of the problems of adhesion of the polymer film at their root. However, the solution proposed appears rather unsatisfactory since an integrating sphere thus formed is not completely opaque, particularly when it has small dimensions, and some of the luminous flux shines through to the outside of the sphere, thus reducing its overall efficiency.

The Applicant has therefore performed research directed towards identifying a conventional coating product, for example, based on barium sulphate or the like, to be applied to the internal cavity of an integrating sphere of non-transparent material, for example, aluminium. The above-mentioned conventional coating products comprise two basic elements: a reflective material such as barium sulphate, and a binder or glue which serves to give the reflective material cohesion. These two ingredients are generally supplied in suspension in a liquid vehicle, for example, a mixture of water and alcohol, suitable for enabling the coating to be applied, for example, by spraying.

The product is applied to the desired surface, after which the liquid vehicle evaporates, leaving a compact layer of reflective material, rendered coherent by the binder, adhering to the surface. As with barium sulphate, the reflective material is used in powder form with a very fine particle size (a mean diameter of approximately 1-2 microns). In particular, barium sulphate has optimal inertness with respect to the chemical attacks to which it may be subjected in a normal working environment.

Examples of known coating products are Eastman Kodak Company's product known by the trade name KODAK White Reflectance Coating and Labsphere Inc.'s product known by the trade name WRC-680 White Reflectance Coating. Both of the above-mentioned known products contain barium sulphate bound by a glue based on polyvinyl polymer which, however, tends to lose its transparency characteristics and to age over time, turning yellow and reducing reflectance in the blue region of the light spectrum, with exposure to light. In order to reduce the significance of the ageing effects, it would be necessary to reduce the percentage of glue in the coating product, to the detriment of the mechanical cohesion of the coating product. Basically, if too much glue is used, the coating tends to yellow after a certain period of time, whereas if too little is used, the coating tends to become "floury" and to become detached from the surface to which it is applied.

In order to be able to apply the reflective material in powder form and the binder to the surface to be coated, it is necessary to disperse these ingredients in a liquid vehicle which must have good fluidity in order to be easily sprayable. The fluid which acts as the vehicle must also evaporate completely, quickly enough not to lengthen the application times but not too quickly in order not to create problems during application, which is usually performed by means of a compressed-air spray gun which may become blocked.

SUMMARY OF THE INVENTION

The object of the present invention is therefore to provide a highly reflective and diffusive painting or, in any case, coating product comprising a reflective material such as barium sulphate and a binder, which overcomes the disadvantages of the prior art and, in particular, which has improved optical characteristics and improved mechanical strength and resistance to ageing. Another object of the invention is to define a method for the application of the painting product to the surface of a substrate body, in particular, to the wall of the internal cavity of an integrating sphere.

To achieve the above-mentioned objects, the subject of the invention is a painting or coating product and a method for its application, which are defined in the appended claims.

The coating product according to one particular embodiment of the invention has been found to be highly diffusely reflective (>95%) in the visible spectral region (400-700nm) as well as Lambertian, that is, such that the intensity reflected by the coating at different angles varies with the cosine law in a manner such that the radiance within the integrating sphere is constant. Moreover, the coating product according to the invention is not photoluminescent, since neither the reflective material used nor the binder, displays photoluminescence phenomena after the absorption of radiation emitted by the lamp.

The coating product according to the invention is particularly resistant to ageing and is stable over time so that its reflectance remains as constant as possible in the course of time, thus limiting loss of efficiency of the sphere and loss of photometric resolution.

The coating product according to the invention has also been found particularly suitable for application to an aluminium substrate, to which it has been found to adhere very well, particularly when the aluminium is anodized.

During the development of the painting product of the patent application, the Applicant has identified some improvements both in the composition of the product and in the method of applying it to a surface, for example, of an integrating sphere, which produce appreciable improvements both with regard to the reflective properties of the painting product and with regard to its characteristics of stability over time and of adhesion to the substrate of the painted surface.

Further characteristics and advantages will become clear from the following description of a preferred but non-limiting example.

A coating product according to the present invention comprises a reflective product such as barium sulphate $BaSO_4$ and an acrylic binder or glue, which are dispersed in a liquid vehicle preferably consisting of a mixture of water and alcohol. The acrylic binder is preferably a product based on acrylic polymer or copolymer, hereinafter referred to generically, for simplicity, as acrylic binder or glue A, for example, the products known by the trade names PRIMAL™ E-1531B and PRIMAL™ B-924, both from Rohm and Haas Company, with a content of approximately 37-39% by weight of acrylic polymers dispersed in water. In particular, the second of the two products is basically an acrylic copolymer cross-linked with zinc, comprising a mixture of methyl methacrylate, butyl acrylate, and methacrylic acid dispersed in water with a small percentage of zinc which is used in small quantities to join the polymer chains together.

The following examples refer to three different coating products which were produced with different percentages of acrylic binder relative to the weight of $BaSO_4$ and different percentages of water and alcohol in the liquid vehicle, in order to identify the optimal sprayability.

EXAMPLE 1

A coating product in which there was 11.6% of the binding product, which was constituted by the product PRIMAL™ B-924, relative to the weight of the $BaSO_4$, was produced; in particular, 60 g of $BaSO_4$, 7 g of PRIMAL™ B-924, 100 g of alcohol, and 30 g of water were mixed. The percentage by weight of acrylic binder to $BaSO_4$ in the dry coating product was therefore approximately 4.5%.

The product thus obtained was initially applied to a sandblasted aluminium plate, producing a coating with optimal cohesion and adhesion, of medium granularity; the low reflectance achieved, which was never greater than 93% for all of the frequencies of the visible spectrum, was due to the irregularity of the surface of the sandblasted plate which was treated with the coating product. Better results were obtained by application to an anodized aluminium surface. When subjected to ageing tests, after exposure to the light of a halogen lamp for approximately 152 hours, the product had not undergone loss of reflectance for wavelengths greater than 500 nm, whereas around 400 nm there was a loss of reflectance of approximately 0.3%, which is a sign of the start of yellowing. In absolute terms, the reflectance values exceeded 96.5% between 500 nm and 600 nm, whereas at 400 nm, the reflectance was around 96%.

EXAMPLE 2

A coating product in which there was 10% of the product PRIMAL™ B-924 relative to the weight of $BaSO_4$ was produced; in particular, 50 g of $BaSO_4$, 5 g of the product PRIMAL™ B-924, 50 g of alcohol, and 50 g of water were mixed. The percentage by weight of acrylic binder to $BaSO_4$ in the dry coating product was therefore about 4%.

The product thus obtained was applied to a black anodized aluminium plate by means of a series of 30 layers applied by medium-light spraying with an airbrush; the resulting surface had medium-fine granularity and optimal mechanical cohesion without substantial flouriness and there were no cracks. Overall, the reflectance values achieved were higher than in the sample with 11.7% of acrylic glue A of Example 1 and reached values of more than 97%. When subjected to ageing tests with a halogen lamp, the sample showed marked ageing, particularly at wavelengths of 400 nm.

EXAMPLE 3

A coating product in which there was 8% of the product PRIMAL™ B-924 relative to the weight of $BaSO_4$ was produced; in particular, 50 g of $BaSO_4$, 4 g of the product PRIMAL™ B-924, 50 g of alcohol and 50 g of water were mixed. The percentage by weight of acrylic binder to $BaSO_4$ in the dry coating product was therefore approximately 3.2%.

Three applications were performed on black anodized aluminium plates by different methods:

2a) 20 layers with prolonged applications: the resulting surface was smooth and compact with optimal surface cohesion of the coating product and flouriness was almost absent; the reflectance was optimal and exceeded 96% for all frequencies, diminishing slightly towards the blue region of the spectrum;

2b) 40 layers with rapid applications: the resulting surface was very grainy, without cracks and with excellent mechanical cohesion, but with fairly low reflectance owing to the formation of channels between the lumps; a more prolonged application did not solve the problem since the coating product did not fill the above-mentioned channels but tended to enlarge the already existing lumps;

2c) 60 layers with very rapid applications: the resulting surface was of medium granularity but cracks formed and the reflectance was around 90%; overall, the application was not optimal mechanically or optically.

When subjected to ageing tests with a halogen lamp, the sample showed a very low drop in reflectance, in any case less than 0.3%.

EXAMPLE 4

A coating product in which there was 3.3% of the product PRIMAL™ E-1531B relative to the weight of $BaSO_4$ was produced. The percentage by weight of acrylic binder relative to the $BaSO_4$ in the dry coating product was therefore approximately 1.3%.

The surface resulting from the application of this product with 3.3% of binder had a high degree of flouriness but showed good optical performance to the extent that the loss of reflectance in the blue region of the spectrum was only 0.4% at 400 nm, 0.3% at 420 nm, and 0.2% at 440 nm, whereas at all of the other frequencies, the reflectance was considerably greater than known coating products using a polyvinyl glue, even reaching 98%.

EXAMPLE 5

A coating product in which there was 6.7% of the product PRIMAL™ B-924 relative to the weight of $BaSO_4$ was produced. The percentage by weight of acrylic binder relative to the $BaSO_4$ in the dry coating product was therefore approximately 2.6%.

The surface resulting from the application of the product with 6.7% of the product PRIMAL™ B-924, displayed some flouriness but did not show any sign of ageing.

EXAMPLE 6

A coating product in which there was more than 35% of the product PRIMAL™ E-1531B relative to the weight of $BaSO_4$ was produced; in particular, 30 g of $BaSO_4$, 11 g of PRIMAL™ E-1531B, and 59 g of water were mixed. The percentage by weight of acrylic binder relative to the $BaSO_4$ in the dry coating product was therefore greater than 14%.

As was to be expected, the use of water alone as the liquid vehicle led to very long drying times between one application of the product and another, performed on a black anodized aluminium plate. A part from that, the final mechanical cohesion of the coating product was very good and the reflectance was satisfactory, on average, at around 85%.

In summary, the best embodiment of the coating product according to the present invention, according to the examples given above, was that in which there was 8% of the product PRIMAL™ B-924, relative to the weight of $BaSO_4$, that is, in which the percentage by weight of acrylic binder A relative to the $BaSO_4$ in the dry coating product was approximately 3.2%. For applications in which the durability of the coating layer is to have priority, the coating product in which there is 10% by weight of the product PRIMAL™ B-924, relative to the weight of barium sulphate represents a satisfactory solution. In this latter coating product, in the dry state, the percentage by weight of acrylic binder A relative to the $BaSO_4$ in the dry coating product is approximately 4%.

The tests carried out showed that reflectance depends not only on the characteristics of the coating product but also on the resulting surface appearance and, in particular, on its roughness. An excessively rough surface has low reflectance because of the formation of lumps which are piled on top of one another leaving, between one pile and another, deep channels through which the light can reach the substrate, in particular, the aluminium. It was therefore found that it is necessary to form smooth or only moderately rough surfaces by applying successive layers of product which are fairly thick but not so thick as to cause the paint to run, with consequent damage to the uniformity of the surface.

Measurements were made on the roughness of the surfaces of some samples, and were then compared with the reflectance achieved. In particular, the characteristics of the same plate coated with a film of coating product according to the invention were measured before and after a compression of its surface which flattened at least the coarsest roughness thereof. The increase in reflectance after the compression of the surface was equal to 2%, exceeding the absolute value of 97%, which is a sign that the coating product—which was already better than the products of the prior art from various points of view—exhibited its best features when it was applied in accordance with particular and accurate methods which enable an even smoother surface, free of coarse roughness, to be produced. It was found experimentally that, given a mean particle size of the dry barium sulphate of from 1 to 2 μm, the surface roughness Ra, measured in accordance with the UNI 3963/2 standards, of an application having an optimal surface appearance was 4 microns. In greater detail, from a measurement of the particles of barium sulphate used in the tests, it was found that about 40% of the particles had dimensions of less than 1 micron and approximately 82% of the particles had dimensions of less than 2 microns.

For application with an airbrush or spray gun, the preferred liquid vehicle is a mixture of water and ethyl alcohol in equal parts, in addition to the water included in the acrylic binder or glue for the dispersion of the acrylic polymer of copolymer. It was also found experimentally that the best results in terms of mechanical strength and cohesion and low roughness of the finished surface were obtained if a first application of binder alone was performed on the bare substrate layer, in particular, on the anodized aluminium. A predetermined number of layers, preferably from 15 to 20 layers of coating painting product were then applied. The applications may, in particular but in non-limiting manner, comprise the spraying of the product for approximately 5 seconds per application. Between one application and the next, a cold-air drying stage is performed, the duration of which is determined substantially by visual checking of the appearance of the coating product which, initially, is transparent or clear and becomes opaque when dry, as a result of the evaporation of the liquid vehicle.

Further tests performed by the Applicant confirmed and improved the results obtained above, as shown in the following example.

EXAMPLE 7

A coating product in which there was 9% of the binding product, which was constituted by the product PRIMAL™ B-924, relative to the weight of $BaSO_4$, was produced. The percentage by weight of acrylic binder relative to the $BaSO_4$ in the dry coating product was therefore approximately 3.6%.

The above-mentioned ingredients were dispersed in a liquid vehicle comprising a mixture of water and alcohol to facilitate the application of the product, for example, by spraying.

The product was applied to a previously degreased aluminium surface. In particular, the product was applied by spraying with the use of a professional spray gun with an 0.8 mm nozzle, supplied with compressed air at a pressure of 0.5 bar. Successive layers of product were applied in a manner such that each application wetted the surface until it was rendered glossy, but without giving rise to running. Each successive application was performed as soon as the layer of product previously applied had lost its glossy appearance, having dried by virtue of the evaporation of the water and of the alcohol. In order to achieve a good final result, it is advisable not to wait too long between one application and the next, since excessive drying would lead to the probable formation of blisters on the surface, which would drastically reduce the optical performance.

Optimal coverage of the surface was achieved by the application of successive layers of product in accordance with the method indicated above, until a thickness of painting product of approximately 0.5-0.6 mm was reached, although the possibility of reaching different thicknesses, depending on the specific characteristics (material, surface roughness, colour, etc.), of the surface to be painted, is not excluded. The preferred application enables 1 liter of product to be used to cover about 3000 cm$^2$ of surface with a paint layer about 0.6 mm thick.

The surface thus painted was subjected to a heat treatment consisting in heating to approximately 100° C. for a period of one hour. This achieved a high degree of durability of the coating the optical characteristics of which also remained unchanged up to a temperature of about 120° C. In particular, the painted surface was compact and resistant to abrasion. As a test, some marks were drawn on the painted surface with a pencil, without producing any permanent grooves. Moreover, after the pencil marks had been erased, the exact conditions of reflectance which the sample had before the marks were drawn on it were restored.

Further tests on the sample surface treated thermally in the manner indicated above demonstrated its resistance to contact with water. This characteristic is particularly advantageous in practical applications since it enables the painted surface to be cleaned, for example, with a damp cloth or by putting it under a stream of running water, without causing degradation of the optical and mechanical characteristics.

The results of the tests carried out by the Applicant on a sample painted with the above-described product, applied in accordance with the preferred method, showed that the reflectance values, which were good even in the ultraviolet range, reached and exceeded 97.5% for wavelengths greater than about 400 nm.

Although the above-mentioned examples relate to the application of the coating product to a substrate of aluminium, preferably anodized aluminium, the product may also be applied to surfaces of different materials. In particular, applications of the coating product to a plastics substrate, in particular PVC, have been performed successfully, achieving results comparable with those described above. Moreover, the method of application of the product, the tools used for its application, and the final heat treatment may vary with regard to the details of implementation, which are indicated above purely by way of non-limiting example.

The principle of the invention remaining the same, the forms of embodiment and details of implementation may therefore vary widely with respect to those described without thereby departing from the scope of the present invention.

What is claimed is:

1. A highly reflective coating product comprising a diffusely reflective product and an acrylic binder or glue, which are dispersed in a liquid vehicle comprising a mixture of alcohol and water, wherein in that the mixture of the liquid vehicle consists of 50% of the alcohol and 50% of water;
   wherein the acrylic binder or glue is a product based on an acrylic polymer or copolymer;
   wherein the acrylic binder or glue contains a methacrylate and
   wherein the quantity of the acrylic polymer or copolymer is between approximately 3% and 4% of the reflective product.

2. A coating product according to claim 1, characterized in that the quantity of the acrylic polymer or copolymer is approximately 3.6% of the reflective product.

3. A coating product according to claim 1, characterized in that the reflective product is selected from the group consisting of barium sulphate, magnesium oxide and magnesium carbonate.

4. A coating product according to claim 3, characterized in that the reflective product is barium sulphate $BaSO_4$ in the form of powder with particles having diameters, on average, of between approximately 1 and 2 microns.

5. A highly diffusely reflective integrating sphere, sample, or element, characterized in that its reflective surface comprises a dried layer of a coating product according to claim 1.

6. An integrating sphere, sample, or element according to claim 5, characterized in that the surface to which the coating product is applied is anodized aluminium.

7. An integrating sphere, sample, or element according to claim 5, characterized in that the surface to which the coating product is applied is a plastics material.

8. A method for the application of a diffusely reflective coating product to a surface, characterized in that it comprises the steps of:
   providing a coating product according to claim 1,
   applying a layer of the coating product to the surface by spraying,
   drying the layer of the coating product, and
   repeating applications of successive layers, alternating with corresponding drying steps, approximately 20 times.

9. A method according to claim 8, characterized in that the application of the first layer of the coating product is preceded by an application to the surface of a layer of an acrylic binder or glue which is free of a reflective material.

10. A method according to claim 8, characterized in that the duration of each spray application is about 5 seconds.

11. A method according to claim 8, characterized in that the drying of the coating product takes place in cold air.

12. A method for the application of a diffusely reflective coating product to a surface, comprising the steps of:
   providing a coating product according to claim 1,
   applying one or more layers of the coating product to the surface, and
   subjecting the surface coated with the coating product to heating for a predetermined period of time at a predetermined temperature.

13. A method according to claim 12, characterized in that the heating takes place at a temperature of about 100° C.

14. A method according to claim 12, characterized in that the surface is heated for a period of about 1 hour.

15. A method according to claim 12, characterized in that the application of each layer of the coating product is performed by spraying in a manner such that the coating product wets the surface until the surface is rendered glossy, but without running.

16. A method according to claim 15, characterized in that the application of each successive layer of the coating product is performed as soon as the surface has lost its glossy appearance by drying.

17. A method according to claim 12, characterized in that successive layers of the coating product are applied until a thickness of the coating product of at least 0.5 mm is reached.

18. An integrating sphere, sample, or element according to claim 7, characterized in that the plastics material is PVC.

19. A highly reflective coating product comprising a diffusely reflective product and an acrylic binder or glue, which are dispersed in a liquid vehicle comprising a mixture of alcohol and water, wherein the alcohol/water ratio in the mixture of alcohol and water is 100:30 by weight;
- wherein the acrylic binder or glue is a product based on an acrylic polymer or copolymer;
- wherein the acrylic binder or glue contains a methacrylate and
- wherein the quantity of the acrylic polymer or copolymer is between approximately 3% and 4% of the reflective product.

20. A coating product according to claim 19, characterized in that the quantity of the acrylic polymer or copolymer is approximately 3.6% of the reflective product.

21. A coating product according to claim 19, characterized in that the reflective product is selected from the group consisting of barium sulphate, magnesium oxide and magnesium carbonate.

22. A coating product according to claim 21, characterized in that the reflective product is barium sulphate $BaSO_4$ in the form of powder with particles having diameters, on average, of between approximately 1 and 2 microns.

23. A highly diffusely reflective integrating sphere, sample, or element, characterized in that its reflective surface comprises a dried layer of a coating product according to claim 19.

24. An integrating sphere, sample, or element according to claim 23, characterized in that the surface to which the coating product is applied is anodized aluminium.

25. An integrating sphere, sample, or element according to claim 23, characterized in that the surface to which the coating product is applied is a plastics material.

26. A method for the application of a diffusely reflective coating product to a surface, characterized in that it comprises the steps of:
- providing a coating product according to claim 19,
- applying a layer of the coating product to the surface by spraying,
- drying the layer of the coating product, and
- repeating applications of successive layers, alternating with corresponding drying steps, approximately 20 times.

27. A method according to claim 26, characterized in that the application of the first layer of the coating product is preceded by an application to the surface of a layer of an acrylic binder or glue which is free of a reflective material.

28. A method according to claim 26, characterized in that the duration of each spray application is about 5 seconds.

29. A method according to claim 26, characterized in that the drying of the coating product takes place in cold air.

30. A method for the application of a diffusely reflective coating product to a surface, comprising the steps of:
- providing a coating product according to claim 19,
- applying one or more layers of the coating product to the surface, and
- subjecting the surface coated with the coating product to heating for a predetermined period of time at a predetermined temperature.

31. A method according to claim 30, characterized in that the heating takes place at a temperature of about 100° C.

32. A method according to claim 30, characterized in that the surface is heated for a period of about 1 hour.

33. A method according to claim 30, characterized in that the application of each layer of the coating product is performed by spraying in a manner such that the coating product wets the surface until the surface is rendered glossy, but without running.

34. A method according to claim 33, characterized in that the application of each successive layer of the coating product is performed as soon as the surface has lost its glossy appearance by drying.

35. A method according to claim 30, characterized in that successive layers of the coating product are applied until a thickness of the coating product of at least 0.5 mm is reached.

36. An integrating sphere, sample, or element according to claim 25, characterized in that the plastics material is PVC.

* * * * *